United States Patent
Liu et al.

(10) Patent No.: US 12,526,556 B2
(45) Date of Patent: Jan. 13, 2026

(54) DOWNSTREAM SYNCHRONIZATION STATE MACHINE FOR OPTICAL LINE TERMINAL (OLT)-CONFIGURABLE BIT INTERLEAVING IN HIGH-SPEED PASSIVE OPTICAL NETWORKS (PONS)

(71) Applicant: Huawei Technologies Co., Ltd., Guandong (CN)

(72) Inventors: Xiang Liu, Addison, TX (US); Andy Shen, Addison, TX (US); Frank Effenberger, Frisco, TX (US); Yuanqiu Luo, Cranbury, NJ (US)

(73) Assignee: Huawei Technologies Co., Ltd., Shenzhen (CN)

( * ) Notice: Subject to any disclaimer, the term of this patent is extended or adjusted under 35 U.S.C. 154(b) by 142 days.

(21) Appl. No.: 18/162,457

(22) Filed: Jan. 31, 2023

(65) Prior Publication Data

US 2023/0179896 A1 Jun. 8, 2023

Related U.S. Application Data

(63) Continuation of application No. PCT/US2021/046524, filed on Aug. 18, 2021.

(Continued)

(51) Int. Cl.
*H04J 14/00* (2006.01)
*H04Q 11/00* (2006.01)

(52) U.S. Cl.
CPC ..... *H04Q 11/0067* (2013.01); *H04Q 11/0066* (2013.01)

(58) Field of Classification Search
CPC ........... H04Q 11/0067; H04Q 11/0066; H04Q 2011/0064; H04L 1/0045; H04L 1/0057;
(Continued)

(56) References Cited

U.S. PATENT DOCUMENTS

| 7,983,308 B1* | 7/2011 | Johnston | H04J 3/0608 |
| | | | 398/154 |
| 7,991,296 B1* | 8/2011 | Johnston | H04J 3/0608 |
| | | | 398/154 |

(Continued)

FOREIGN PATENT DOCUMENTS

| CN | 106331908 A | 1/2017 |
| JP | 2010068201 A | 3/2010 |

(Continued)

OTHER PUBLICATIONS

Luo, "Higher Speed Passive Optical Networks: Common Transmission Convergence Layer Specification; TD621R1/PLEN," ITU-T Draft; Study Period 2017-2020,; Study Group 15; Series TD621R1/PLEN, International Telecommunication Union, Geneva; CH, vol. 2/15, Sep. 4, 2020 (Sep. 4, 2020), pp. 1-227, XP044297114, Retrieved from the Internet: URL:https://www.itu.int/ifa/t/2017/sg15/docs/200907/td/ties/plen/T17-SG15-200907-TD-PLEN-0621!R1!MSW-E.docx, retrieved on Sep. 4, 2020.

(Continued)

*Primary Examiner* — Hanh Phan
(74) *Attorney, Agent, or Firm* — Conley Rose, P.C.

(57) ABSTRACT

A method implemented by an optical network unit (ONU) in a passive optical network (PON). The method includes receiving an encoded downstream (DS) signal from an optical line terminal (OLT), searching for a physical synchronization sequence (PSync) pattern in all possible alignments for all possible OLT bit-interleaving modes within the downstream signal, and transitioning to a pre-synchronization state once the PSync pattern has been found.

20 Claims, 8 Drawing Sheets

Related U.S. Application Data

(60) Provisional application No. 63/091,657, filed on Oct. 14, 2020.

(58) Field of Classification Search
CPC ... H04L 1/0071; H04L 7/0075; H04L 1/0041; H04L 1/0052; H04J 3/0608; H04B 10/27
USPC ........ 398/66, 67, 68, 69, 70, 71, 72, 74, 75, 398/154, 155, 79, 98, 99, 100, 135, 136, 398/33, 38, 25, 26, 27, 202, 208, 209; 370/352, 392, 389, 468, 465
See application file for complete search history.

(56) References Cited

U.S. PATENT DOCUMENTS

| | | | | |
|---|---|---|---|---|
| 8,406,633 | B1* | 3/2013 | Johnston | H04J 3/0608 398/58 |
| 8,443,269 | B2* | 5/2013 | Lee | H04L 1/008 714/755 |
| 8,718,087 | B1* | 5/2014 | Johnston | H04L 12/12 370/463 |
| 9,203,545 | B2* | 12/2015 | Zheng | H04J 3/1694 |
| 2008/0288851 | A1 | 11/2008 | Park | |
| 2009/0263130 | A1 | 10/2009 | Luo et al. | |
| 2012/0117442 | A1* | 5/2012 | Lee | H04L 1/008 714/755 |
| 2013/0142206 | A1* | 6/2013 | Kota | H03M 13/271 370/469 |

FOREIGN PATENT DOCUMENTS

| | | | | |
|---|---|---|---|---|
| JP | 2017183803 | A | 10/2017 | |
| KR | 20160108131 | A | 9/2016 | |
| WO | WO-2020200249 | A1 * | 10/2020 | ............ H03M 13/11 |

OTHER PUBLICATIONS

Maxlinear, "G.HSP: Proposal for Downstream Interleaver—Synchronization; C", ITU-T Draft; Study Period 2021-2024; Study Group 15; Series C, International Telecommunication Union, Geneva,; CH, vol. 2/15, Feb. 5, 2021 (Feb. 5, 2021), pp. 1-10, XP044304856, Retrieved from the Internet: URL: https://www.itu.int/ifa/t/2017/sg15/exchange/wp1/q2/21-02-08_Zoom/201208_D34_5min_Maxlinear_HSP_Donstream_Interleaving-synchronization.docx [retrieved on Feb. 5, 2021].

Suvakovic, et al., "Lower Energy Bit-Interleaving Downstream Protocol for Passive Optical Networks," Online Converence on Green Coummunications (GREENCOM), 2012 IEEE, IEEE, Sep. 25, 2012 (Sep. 25, 2012), pp. 26-31, XP032410985, DOI: 10.1109/GREENCOM.2012.6519611, ISBN: 978-1-4799-0395-5.

Luo, Y., et al., "Higher Speed Passive Optical Networks: Common Transmission Convergence Layer Specification," Study Group 15, Telecommunication Standardization Sector, Study Period 2017-2020, Sep. 4, 2020, 242 pages.

Suvakovic, D., et al., "Low energy bit-interleaving downstream protocol for passive optical networks," IEEE 2012, Sep. 25, 2012, pp. 26-31.

Maxlinear, V., "G.HSO: Proposal for downstream interleaver—syncronization," ITU-T Draft, Study period 2021-2024, Study Group 15, Series C. Feb. 5, 2021, 10 pages.

ITU-T G.9804.2, Series G: Transmission Systems and Media, Digital Systems and Networks Access networks Optical line systems for local and access networks, Higher speed passive optical networks—Common transmission convergence layer specification, (Sep. 2021), total 246 pages.

* cited by examiner

DOWNSTREAM SYNCHRONIZATION STATE MACHINE FOR OPTICAL LINE TERMINAL (OLT)-CONFIGURABLE BIT INTERLEAVING IN HIGH-SPEED PASSIVE OPTICAL NETWORKS (PONS)

CROSS-REFERENCE TO RELATED APPLICATIONS

This patent application is a continuation of International Patent Application No. PCT/US2021/046524, filed on Aug. 18, 2021, which claims the benefit of U.S. Provisional Patent Application No. 63/091,657 filed Oct. 14, 2020, by Xiang Liu, et al., and titled "Downstream Synchronization State Machine for Optical Line Terminal (OLT)-Configurable Bit Interleaving in High-Speed Passive Optical Networks (PONs)." All of the aforementioned applications are hereby incorporated by reference in their entireties.

TECHNICAL FIELD

The present disclosure is generally related to the field of optical networks and, in particular, to optional interleaving in optical networks.

BACKGROUND

Optical networks are networks that use optical signals to carry data. Light sources such as lasers generate optical signals. Modulators modulate the optical signals with data to generate modulated optical signals. Various optical network components transmit, propagate, amplify, receive, and process the modulated optical signals. Optical networks may employ multiplexing to achieve high bandwidths. Optical networks implement data centers, metropolitan networks, PONs, long-haul transmission systems, and other applications.

SUMMARY

The disclosed aspects/embodiments provide techniques permitting an Optical Network Unit (ONU) receiving a downstream signal to detect whether an Optical Line Terminal (OLT) has implemented non-interleaving or has implemented bit-interleaving when formulating the downstream signal. The ONU searches for a physical synchronization sequence (PSync) pattern in all possible alignments for all possible OLT bit-interleaving modes within the downstream signal. The ONU performs this pattern search to determine whether the OLT was using non-interleaving or a certain mode of bit-interleaving to encode the downstream signal sent to the ONU.

A first aspect relates to a method implemented by an optical network unit (ONU) in a passive optical network (PON), comprising: receiving an encoded downstream (DS) signal from an optical line terminal (OLT); searching for a physical synchronization sequence (PSync) pattern in all possible alignments for all possible OLT bit-interleaving modes within the downstream signal; and transitioning to a pre-synchronization state once the PSync pattern has been found.

Optionally, in any of the preceding aspects, another implementation of the aspect provides that the all possible OLT bit-interleaving modes comprises a non-interleaving mode and a m× bit-interleaving mode in which m adjacent forward error correction (FEC) codewords are interleaved on a bit-by-bit basis.

Optionally, in any of the preceding aspects, another implementation of the aspect provides that m is set to 4.

Optionally, in any of the preceding aspects, another implementation of the aspect provides that the FEC is based on low density parity check (LDPC).

Optionally, in any of the preceding aspects, another implementation of the aspect provides that the FEC codeword length is 17,280 bits.

Optionally, in any of the preceding aspects, another implementation of the aspect provides that during the searching, the ONU switches between a non-deinterleaving mode and a m× bit-deinterleaving mode every N consecutive failures to find the PSync pattern, wherein N is at least the length of a physical layer (PHY) frame and wherein the m× bit-deinterleaving mode comprises deinterleaving the m adjacent FEC codewords on a bit-by-bit basis.

Optionally, in any of the preceding aspects, another implementation of the aspect provides that m is set to 4.

Optionally, in any of the preceding aspects, another implementation of the aspect provides that the FEC is based on low density parity check (LDPC).

Optionally, in any of the preceding aspects, another implementation of the aspect provides that the FEC codeword length is 17,280 bits.

Optionally, in any of the preceding aspects, another implementation of the aspect provides that the length of the PHY frame comprises 6,220,800 bits.

Optionally, in any of the preceding aspects, another implementation of the aspect provides that the ONU is in a Hunt state while performing the searching.

Optionally, in any of the preceding aspects, another implementation of the aspect provides that the ONU is unsynchronized while in the Hunt state.

Optionally, in any of the preceding aspects, another implementation of the aspect provides that the all possible alignments comprise one or more of bit alignments and byte alignments.

Optionally, in any of the preceding aspects, another implementation of the aspect provides that the downstream signal comprises one or more physical layer (PHY) frames.

Optionally, in any of the preceding aspects, another implementation of the aspect provides that searching for the PSync pattern includes error-tolerant pattern matching.

Optionally, in any of the preceding aspects, another implementation of the aspect provides that searching for the PSync pattern comprises verifying a superframe counter (SFC) hybrid error control (HEC).

Optionally, in any of the preceding aspects, another implementation of the aspect provides that the PSync pattern has been found when the PSync pattern with up to a maximum number of bit errors (K) has been detected.

A second aspect relates to an optical network unit (ONU) in a passive optical network (PON), comprising: a memory configured to store instructions; and one or more processors coupled to the memory, the one or more processors configured to execute the instructions to cause the ONU to: receive an encoded downstream (DS) signal from an optical line terminal (OLT); search for a physical synchronization sequence (PSync) pattern in all possible alignments for all possible OLT bit-interleaving modes within the downstream signal; and transition to a pre-synchronization state once the PSync pattern has been found.

Optionally, in any of the preceding aspects, another implementation of the aspect provides that the all possible OLT bit-interleaving modes comprises a non-interleaving mode and a m× bit-interleaving mode in which m adjacent forward error correction (FEC) codewords are interleaved on a bit-by-bit basis.

Optionally, in any of the preceding aspects, another implementation of the aspect provides that m is set to 4.

Optionally, in any of the preceding aspects, another implementation of the aspect provides that during the search, the ONU is configured to switch between a non-deinterleaving mode and a 4× bit-deinterleaving mode every N consecutive failures to find the PSync pattern, wherein N is at least the length of a physical layer (PHY) frame and wherein the m× bit-deinterleaving mode comprises deinterleaving the m adjacent FEC codewords on a bit-by-bit basis.

Optionally, in any of the preceding aspects, another implementation of the aspect provides that the length of the PHY frame comprises 6,220,800 bits.

Optionally, in any of the preceding aspects, another implementation of the aspect provides that the ONU is in a Hunt state while performing the search.

Optionally, in any of the preceding aspects, another implementation of the aspect provides that the ONU is unsynchronized while in the Hunt state.

Optionally, in any of the preceding aspects, another implementation of the aspect provides that the all possible alignments comprise one or more of bit alignments and byte alignments.

Optionally, in any of the preceding aspects, another implementation of the aspect provides that the downstream signal comprises one or more physical layer (PHY) frames.

Optionally, in any of the preceding aspects, another implementation of the aspect provides that the search for the PSync pattern includes error-tolerant pattern matching.

Optionally, in any of the preceding aspects, another implementation of the aspect provides that the search for the PSync pattern comprises verifying a superframe counter (SFC) hybrid error control (HEC).

Optionally, in any of the preceding aspects, another implementation of the aspect provides that the P Sync pattern has been found when the P Sync pattern with up to a maximum number of bit errors (K) has been detected.

A third aspect relates to a passive optical network (PON), comprising: an optical line terminal (OLT) configured to transmit an encoded downstream (DS) signal; and an optical network unit (ONU) in communication with the OLT, wherein the ONU is configured to perform the method in any of the disclosed embodiments.

A fourth aspect relates to an optical network unit (ONU) means in a passive optical network (PON), comprising: memory means configured to store instructions; and processing means configured to execute the instructions to cause the ONU means to: receive an encoded downstream (DS) signal from an optical line terminal (OLT); search for a physical synchronization sequence (PSync) pattern in all possible alignments for all possible OLT bit-interleaving modes within the downstream signal; and transition to a pre-synchronization state once the PSync pattern has been found.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In a high-speed PON (HSP) such as the 50-gigabit-capable passive optical network (50G-PON), bit-interleaving over multiple adjacent forward error correction (FEC) codewords is an optional feature for downstream signal (a.k.a., downstream transmission). Therefore, an optical line terminal (OLT) has the option of switching between using non-interleaving and using bit-interleaving when formulating downstream signal. Unfortunately, there is currently no way for the optical network unit (ONU) receiving the downstream signal to detect whether the OLT will implement non-interleaving or bit-interleaving when formulating the downstream transmission.

Disclosed herein are techniques permitting the ONU receiving the downstream signal to detect whether the OLT has implemented non-interleaving, or has implemented a certain mode of bit-interleaving when formulating the downstream signal. The ONU searches for a physical synchronization sequence (PSync) pattern in all possible alignments for all possible OLT bit-interleaving modes within the downstream signal. The ONU performs this pattern search to determine whether the OLT was using non-interleaving or a certain mode of bit-interleaving to encode the downstream signal sent to the ONU.

Figure 1:
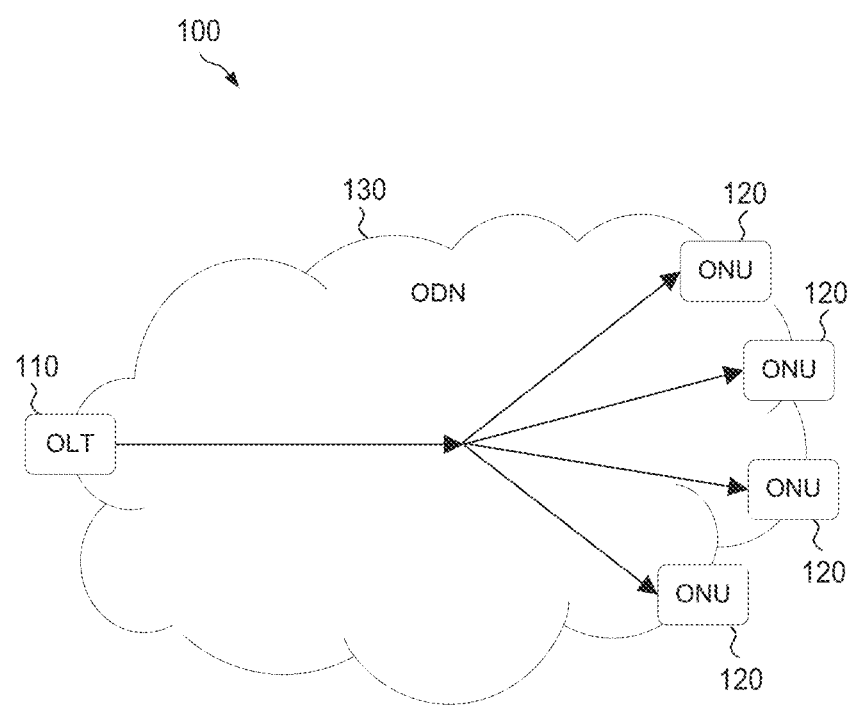
FIG. 1 is a schematic diagram of a passive optical network (PON).

FIG. 1 is a schematic diagram of a PON 100. The PON 100 comprises an OLT 110, ONUs 120, and an ODN 130 that couples the OLT 110 to the ONUs 120. The PON 100 is a communications network that may not require active components to distribute data between the OLT 110 and the ONUs 120. Instead, the PON 100 may use passive optical components in the ODN 130 to distribute the data.

The OLT 110 communicates with another network and with the ONUs 120. For instance, the OLT 110 transfers data from the other network to the ONUs 120, and transfers data from the ONUs 120 to the other network. The OLT 110 is typically located at a central location such as a central office (CO), but it may also be located at other suitable locations.

The ODN 130 is a data distribution network that comprises optical fiber cables, couplers, splitters, distributors, and other suitable components. The components include passive optical components that do not require power to distribute data between the OLT 110 and the ONUs 120. The ODN 130 may extend from the OLT 110 to the ONUs 120 in a configuration as shown, or may be configured in any other suitable point-to-multipoint (P2MP) configuration.

The ONUs 120 communicate with the OLT 110 and with customers. For instance, the ONUs 120 transfer data from the OLT 110 to the customers and transfer data from the customers to the OLT 110. ONUs 120 and optical network terminals (ONTs) are similar, and the terms may be used interchangeably. The ONUs 120 are typically located at distributed locations such as customer premises, but they may also be located at other suitable locations.

Figure 2:
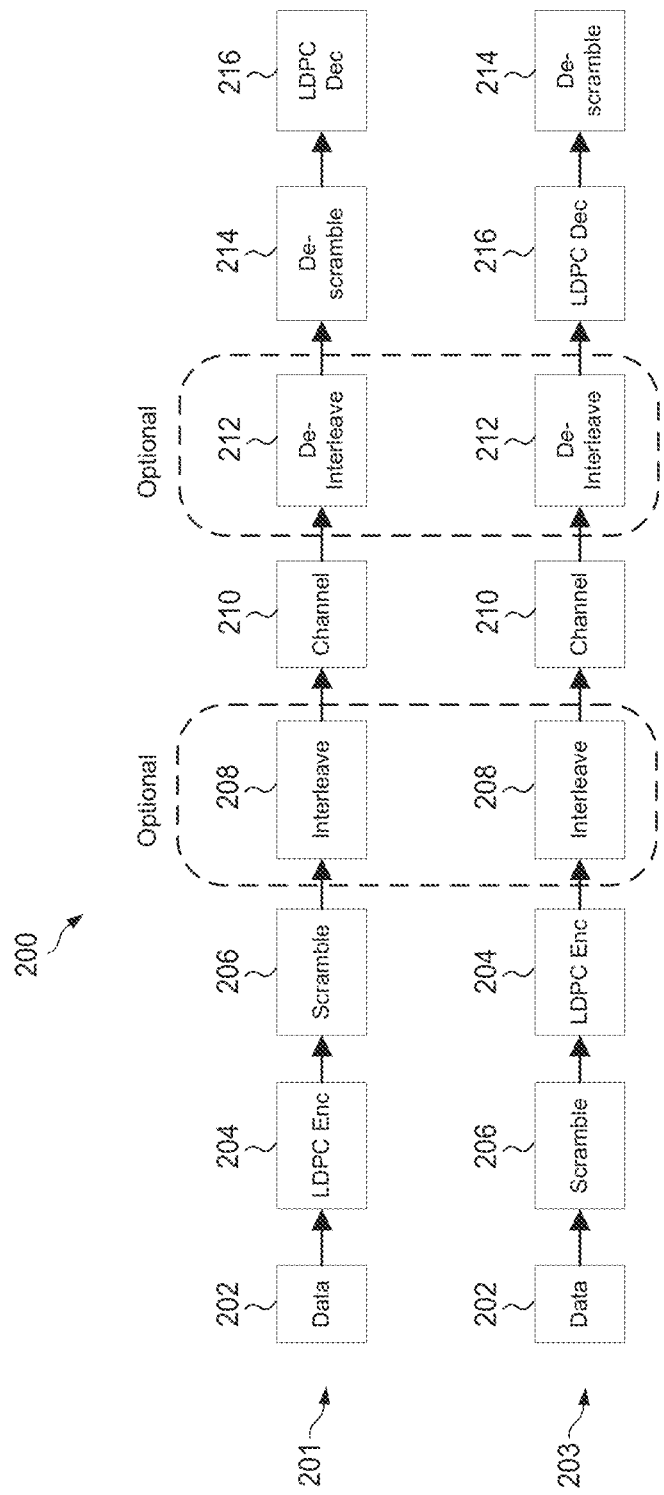
FIG. 2 is a schematic diagram illustrating data path functions including optional interleaving and deinterleaving within downstream (DS) signals.

FIG. 2 is a schematic diagram 200 illustrating data path functions including optional interleaving and deinterleaving within downstream (DS) signals. As shown in the upper sequence 201, data 202 is obtained by an OLT (e.g., the OLT 110). The OLT utilizes, for example, a low density parity check (LDPC) encoding 204 to encode the data 202 for FEC. The OLT then scrambles 206 the encoded data. The OLT may or may not perform interleaving 208 on the encoded data. That is, the interleaving 208 is optional. When performed, it is desirable that the interleaving be performed over consecutive LDPC codewords on a bit-by-bit basis, which is herein abbreviated as mx bit-interleaving. Preferably, 4× bit-interleaving is performed. For example, with the 4× bit-interleaving, every four adjacent LPDC codewords with a codeword length of 17280 bits, represented as $[A_1 \ A_2 \ldots A_{17280} \ B_1 \ B_2 \ldots B_{17280} \ C_1 \ C_2 \ldots C_{17280} \ D_1 \ D_2 \ldots D_{17280}]$, are interleaved to $[A_1 \ B_1 \ C_1 \ D_1 \ A_2 \ B_2 \ C_2 \ D_2 \ldots A_{17280} \ B_{17280} \ C_{17280} \ D_{17280}]$. The function of the interleaving 208 is to mitigate the performance degradation of FEC in the presence of correlated errors, which may be introduced due to channel equalization. After the interleaving 208, the downstream signal is transmitted over a transmission channel 210 (a.k.a., the PON physical channel), so the common transmission convergence layer (ComTC) is minimally impacted. Thereafter, the encoded data is transmitted, by the OLT, over the transmission channel 210 toward one or more ONUs (e.g., ONUs 120).

When received, the ONU may or may not perform deinterleaving 212 on the encoded data received from the OLT over the transmission channel 210, depending on whether interleaving is detected in the encoded data. That is, the de-interleaving 212 must be performed by the ONU 120 if interleaving was performed by the OLT 110. When performed, the deinterleaving 212 may be performed over consecutive LDPC codewords on a bit-by-bit basis, which is herein abbreviated as mx bit-deinterleaving. Preferably, 4× bit-deinterleaving is performed. For example, with the 4× bit-deinterleaving, every four interleaved LPDC codewords with a codeword length of 17280 bits, represented as $[A_1 \ B_1 \ C_1 \ D_1 \ A_2 \ B_2 \ C_2 \ D_2 \ldots A_{17280} \ B_{17280} \ C_{17280} \ D_{17280}]$, are de-interleaved to $[A_1 \ A_2 \ldots A_{17280} \ B_1 \ B_2 \ldots B_{17280} \ C_1 \ C_2 \ldots C_{17280} \ D_1 \ D_2 \ldots D_{17280}]$, which is the original data sequence right before the interleaving 208. The ONU descrambles 214 the encoded data. After the encoded data has been descrambled 214, the ONU then decodes the encoded data using, for example, LDPC decoding 216.

In an embodiment, the descrambling is performed by a descrambler within the ONU that uses the scrambling polynomial $x^{58}+x^{39}+1$. In an embodiment, the descrambler uses a variable starting bit sequence derived from the superframe counter (SFC). In an embodiment, the SFC is obtained after FEC decoding. In an embodiment, a variable starting sequence is [1 1 1 1 1 1 1 SFC].

Notably, the order of operations performed in the upper sequence 201 may be changed, as shown in the lower sequence 203. In the lower sequence, data 202 is obtained by an OLT (e.g., the OLT 110). The OLT scrambles 206 the data. The OLT then utilizes, for example, LDPC encoding 204 to encode the scrambled data 206. The OLT may or may not perform interleaving 208 on the encoded data. That is, the interleaving 208 is optional. Thereafter, the encoded data is transmitted, by the OLT, over a transmission channel 210 toward one or more ONUs (e.g., ONUs 120).

When received, the ONU may or may not perform deinterleaving 212 on the encoded data received from the OLT over the transmission channel 210. That is, the deinterleaving 212 is optional. The ONU decodes the encoded data using, for example, LDPC decoding 216. The ONU then descrambles 214 the LDPC decoded data.

When 4× bit-interleaving is utilized in the upper sequence 201 or the lower sequence 203, a physical synchronization sequence (PSync) of $S_1 S_2 S_3 \ldots S_{63} S_{64}$, where S represents bits of the PSync, becomes $S_1 xxx S_2 xxx S_3 xxx \ldots S_{63} xxx S_{64} xxx$, where x represents bits of data interleaved into the PSync. Because the PSync pattern is changed when the optional 4× bit-interleaving is used, the downstream state machine needs to be modified to accommodate the optional 4× bit-interleaving.

Figure 3:
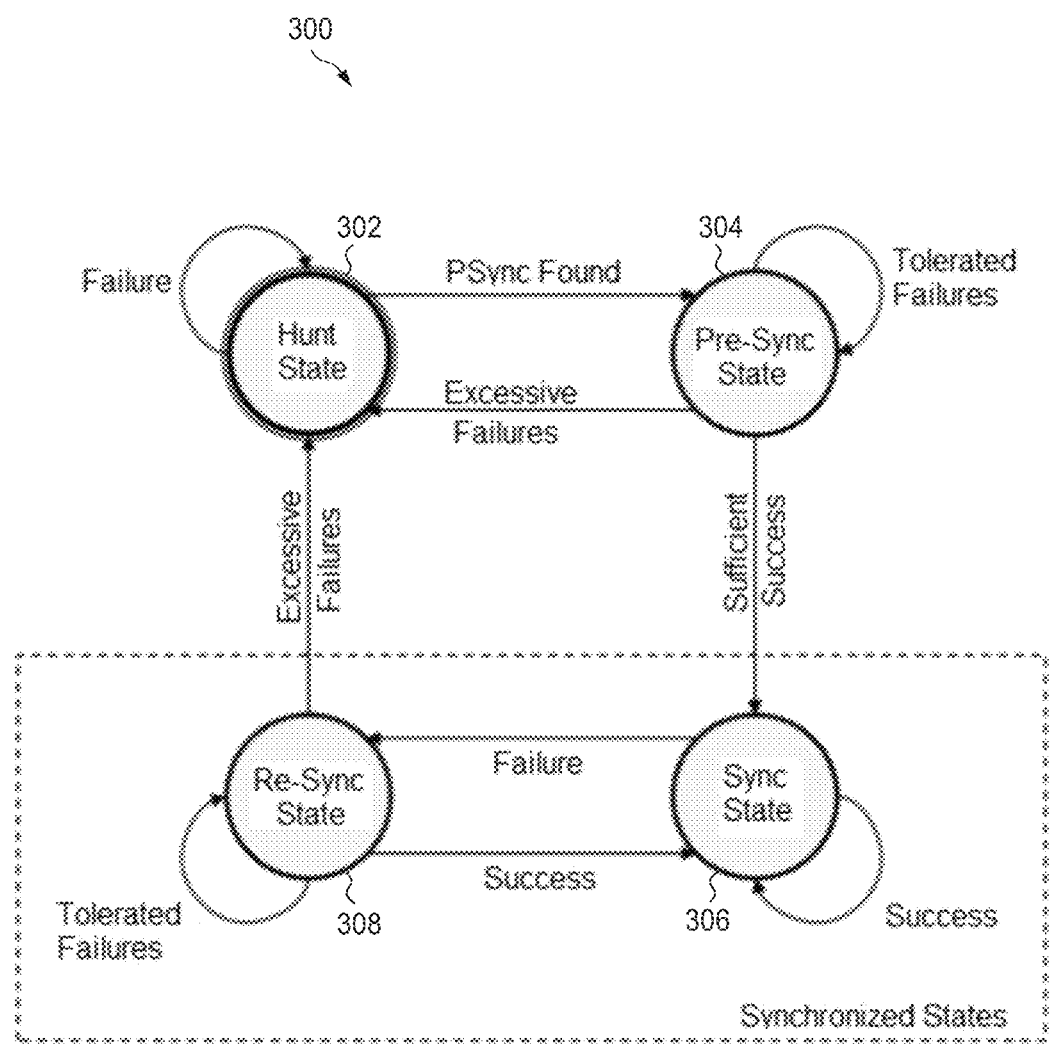
FIG. 3 is a schematic diagram of a downstream synchronization state machine.

FIG. 3 is a schematic diagram of a downstream synchronization state machine 300. The downstream synchronization state machine 300 may be implemented by an ONU in a HSP PON such as a 50G PON. The ONU begins in a Hunt state 302. In the Hunt state 302, the ONU is unsynchronized. While in the Hunt state 302, the ONU searches for the PSync pattern in all possible alignments (both bit and byte) within the downstream signal. In an embodiment, all possible OLT bit-interleaving modes comprise a non-interleaving mode and a mx bit-interleaving mode in which m adjacent forward error correction (FEC) codewords are interleaved on a bit-by-bit basis, where m is set to 4, the FEC is based on LDPC, and/or FEC codeword length is 17,280 bits. In an embodiment, during the searching, the ONU switches between a non-deinterleaving mode and a mx bit-deinterleaving mode, in which m adjacent FEC codewords are deinterleaved on a bit-by-bit basis, every N consecutive failures to find the PSync pattern, wherein N is at least the length of a PHY frame, where m is set to 4, the FEC is based on LDPC, and/or the FEC codeword length is 17,280 bits. Once the ONU has found the PSync pattern at the beginning of a frame to a suitable degree of certainty, the ONU transitions to the Pre-Sync state 304. Finding the PSync pattern may include, for example, error-tolerant pattern matching and verifying other protocol elements such as the SFC hybrid error control (HEC).

Once in the Pre-Sync state 304, the ONU is still unsynchronized. However, in an effort to become synchronized, the ONU performs synchronization verification on the received data. When there are excessive failures (a.k.a., excessive errors) experienced during the synchronization verification process, the ONU returns to the Hunt state 302. When there are only tolerated failures (a.k.a., tolerated errors) experienced during the synchronization verification process, the ONU may persist in the Pre-Sync state 304 until the ONU experiences sufficient success or excessive failure. When there is sufficient success achieved during the synchronization verification process, the ONU transitions to a Synchronized state 306. Once in the Synchronized state 306, the ONU is synchronized.

The ONU remains in the Synchronized state 306 as long as the synchronization verification process continues to be successful. The ONU transitions to the Re-Sync state 308 when the synchronization verification process fails. Once in the Re-Sync state 308, the ONU is still synchronized. The ONU continues to perform the synchronization verification process and transitions back to the Sync state 306 when synchronization verification process is successful. When there are excessive failures experienced during the synchronization verification process, the ONU declares a loss of downstream synchronization and returns to the Hunt state 302.

Unfortunately, the downstream synchronization state machine 300 of FIG. 3 is unable to accommodate OLT-configurable bit interleaving. That is, the state machine 300 is not suited to handle the OLT switching between non-interleaving and 4× bit-interleaving.

Figure 4:
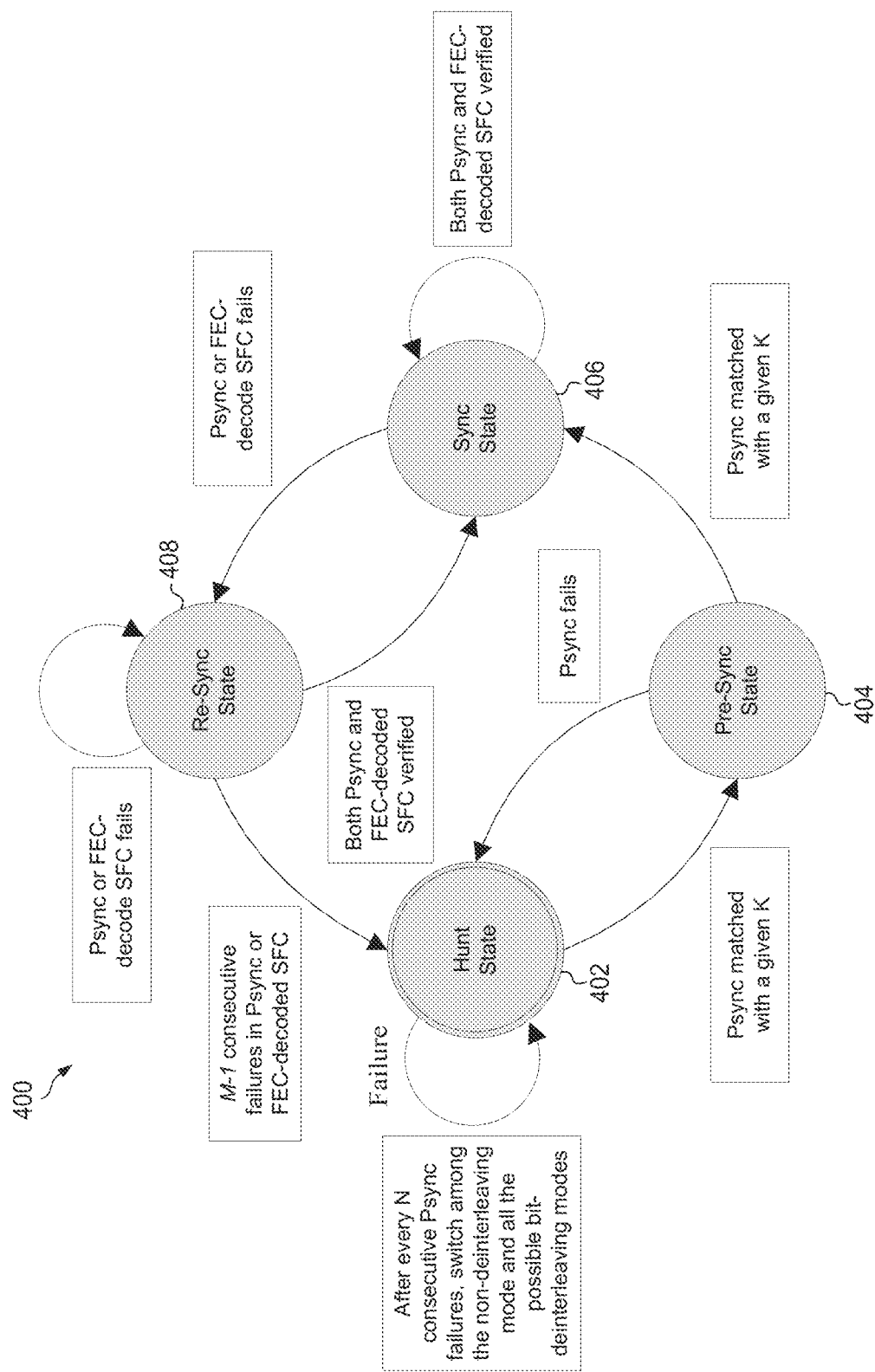
FIG. 4 is a schematic diagram of a downstream synchronization state machine configured to accommodate the optional interleaving and deinterleaving according to an embodiment of the disclosure.

FIG. 4 is a schematic diagram of a downstream synchronization state machine 400 configured to accommodate the optional interleaving and deinterleaving according to an embodiment of the disclosure. The downstream synchronization state machine 400 may be implemented by an ONU in a HSP PON such as a 50G PON. The ONU begins in a Hunt state 402. In the Hunt state 402, the ONU is unsynchronized. While in the Hunt state 402, the ONU searches for the PSync pattern in all possible alignments (both bit and byte) for all possible OLT bit-interleaving modes within the downstream signal. For example, when the OLT has two interleaving modes (e.g., a non-interleaving mode and a 4× bit-interleaving mode), the ONU receiver data path switches between non-deinterleaving and 4× bit-deinterleaving after every N consecutive PSync failures to find the PSync pattern, wherein N is at least the length of a physical layer (PHY) frame. In an embodiment, N is set to the length of the PHY frame. In an embodiment, the length of the frame comprises 6,220,800 bits.

Once the ONU has found the PSync pattern at the beginning of a frame (e.g., PHY frame) to a suitable degree of certainty, the ONU transitions to the Pre-Sync state 404. Finding the PSync pattern may include, for example, error-tolerant pattern matching and verifying other protocol elements such as the superframe counter (SFC) hybrid error control (HEC).

In an embodiment, each ONU detects whether the bit-interleaving mode (e.g., the 4× bit-interleaving mode) is enabled or not at the OLT during the Hunt state 402. In an embodiment, this can be achieved by PSync matching to find the correct PSync position and interleaving status using $R_1R_5R_9 \ldots R_{249}R_{253}$ and $R_1R_2R_3 \ldots R_{63}R_{64}$, where $R_n$ is the $n^{th}$ bit received by the ONU. In an embodiment, a single correlator is used in sequence to perform the PSync matching with and without the 4× bit-interleaving. In another embodiment, PSync is detected by processing the received data with and without the deinterleaving and finding a match with the PSync pattern $S_1S_2S_3 \ldots S_{63}S_{64}$ over the length of at least one PHY frame. Regardless of the actual implementation, the essence is to find the PSync match via trial and error with and without the deinterleaving.

The Pre-Sync state 404, the Sync state 406, and the Re-Sync state 408 of FIG. 4 are similar to the Pre-Sync state 304, the Sync state 306, and the Re-Sync state 308 of FIG. 3. Once in the Pre-Sync state 404, the ONU is still unsynchronized. However, in an effort to become synchronized, the ONU performs synchronization verification on the received data. When PSync fails, the ONU returns to the Hunt state 402. When the PSync matches with a given maximum number of bit errors, K, the ONU transitions to a Synchronized state 406. In an embodiment, K has a value of 7. However, K can have other values in practical applications. Once in the Synchronized state 406, the ONU is synchronized.

In the Synchronized state 406, both the PSync pattern and the FEC-decoded SFC are verified. The ONU transitions to the Re-Sync state 408 when the PSync pattern or the FEC-decoded SFC fail. The ONU continues to perform the synchronization verification process and transitions back to the Sync state 406 when the PSync pattern and FEC-decoded SFC are verified (e.g., the synchronization verification process is successful). The ONU remains in the Re-Sync state 408 when the PSync pattern or the FEC-decoded SFC continue to fail verification.

When there are M−1 consecutive failures (a.k.a., excessive failures) experienced during the synchronization verification process, the ONU declares a loss of downstream synchronization and returns to the Hunt state 402. In an embodiment, M has a value of 3. However, M can have other values in practical applications.

The downstream synchronization state machine 400 enables both the synchronization and the correct deinterleaving process in the receiver data path. As such, the data path processes that follow can continue to recover the bits of the downstream signal without interruption.

Figure 5:
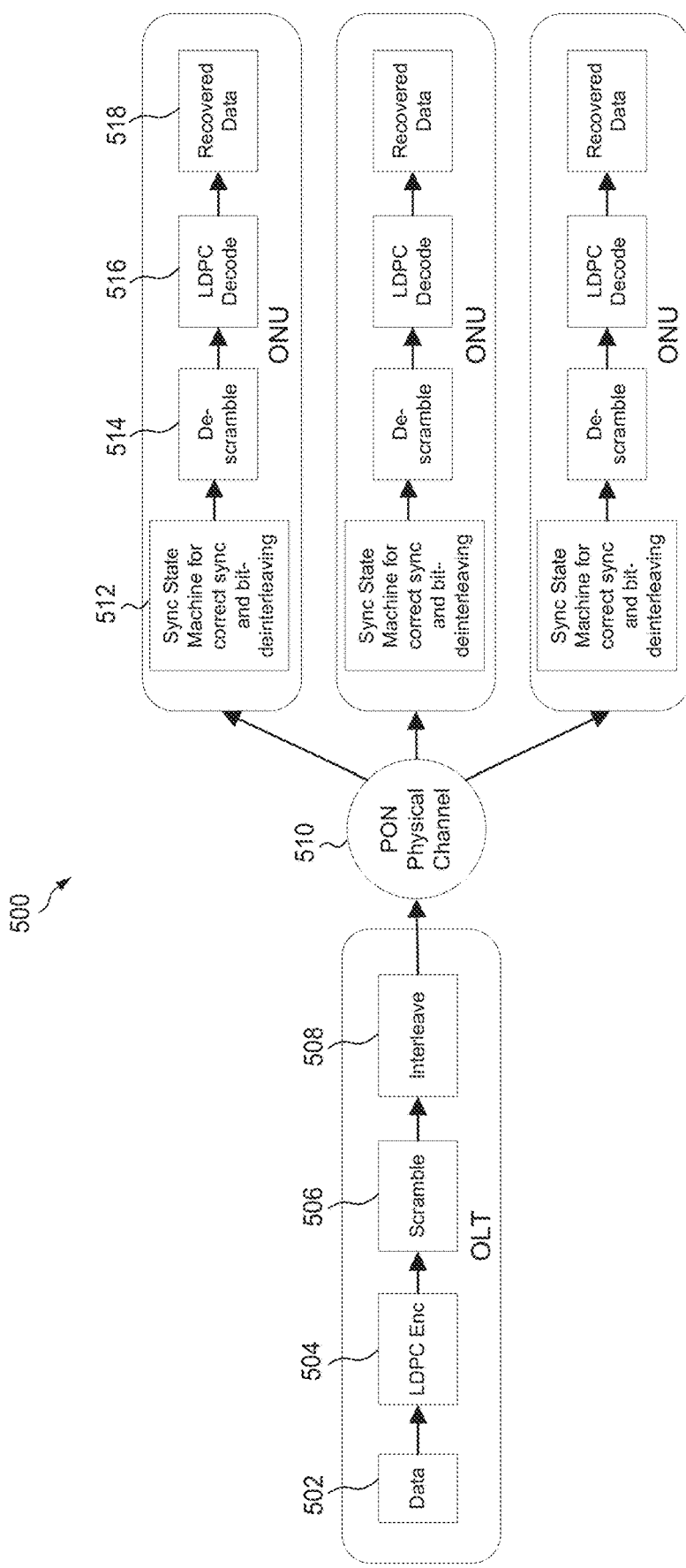
FIG. 5 is a schematic diagram of data path functions according to an embodiment of the disclosure.

FIG. 5 is a schematic diagram 500 of data path functions according to an embodiment of the disclosure. As shown, data 502 is obtained by an OLT (e.g., the OLT 110). The OLT utilizes, for example, LDPC encoding 504 to encode the data 502. The OLT then scrambles 506 the encoded data. The OLT may or may not perform interleaving 508 on the encoded data. That is, the interleaving 508 is optional. When performed, it is desirable that the interleaving be performed immediately before the downstream signal is transmitted over the transmission channel 510 (a.k.a., the PON physical channel). Thereafter, the encoded data is transmitted, by the OLT, over a transmission channel 510 toward the ONUs (e.g., ONUs 120).

When received, each of the ONUs uses a downstream synchronization state machine (e.g., the downstream synchronization state machine 300, 400) for correct synchronization and bit-deinterleaving 512. The bit-deinterleaving is performed when an ONU has determined that the OLT used bit-interleaving (e.g., 4× bit-interleaving). The ONU descrambles 514 the encoded data. After the encoded data has been descrambled 514, the ONU then decodes the encoded data using, for example, LDPC decoding 516. Thereafter, the data is recovered 518.

Figure 6:
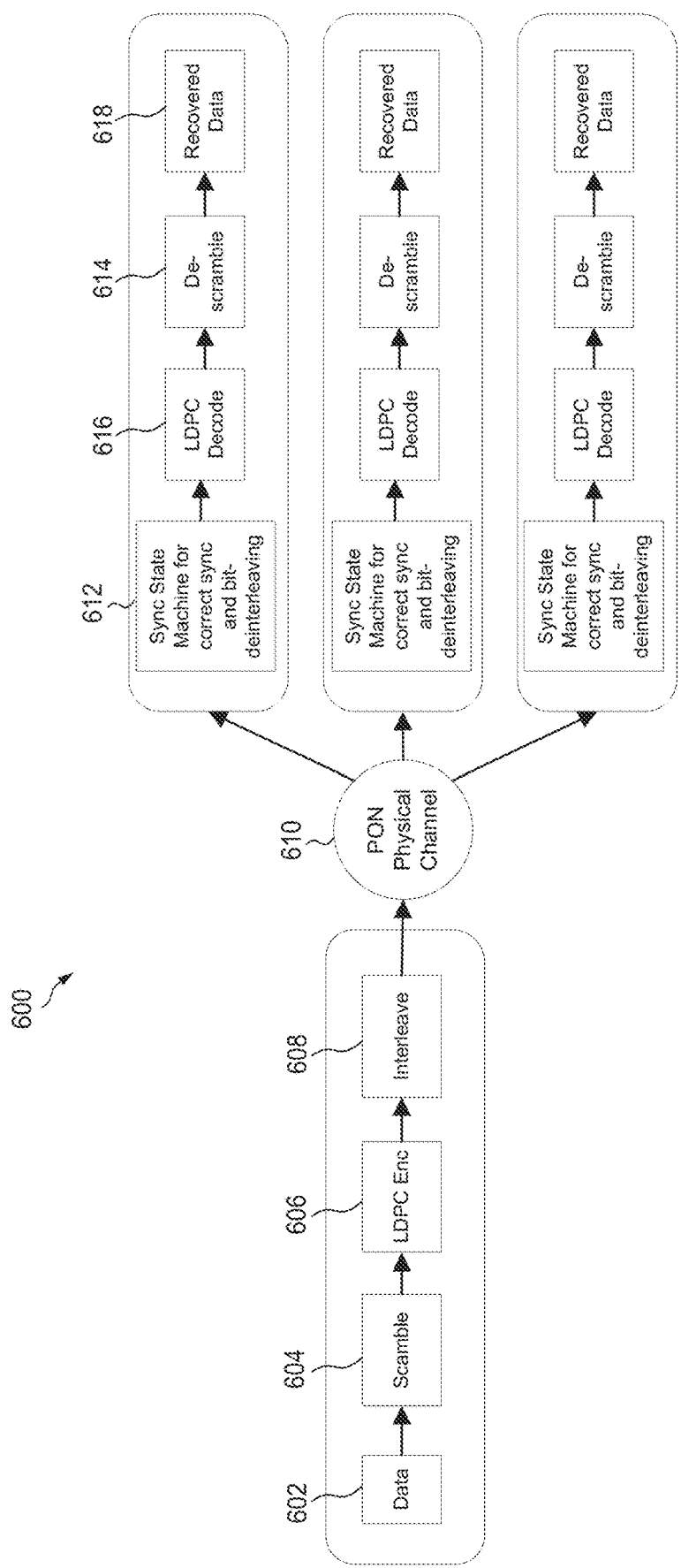
FIG. 6 is a schematic diagram of data path functions according to an embodiment of the disclosure.

FIG. 6 is a schematic diagram 600 of data path functions according to an embodiment of the disclosure. Notably, the order of operations performed in the schematic diagram 600 is changed relative to the schematic diagram 500 of data path functions depicted in FIG. 5.

As shown, data 602 is obtained by an OLT (e.g., the OLT 110). The OLT scrambles 604 the data. The OLT then utilizes, for example, LDPC encoding 606 to encode the scrambled data 604. The OLT may or may not perform interleaving 608 on the encoded data. That is, the interleaving 608 is optional for the OLT. When performed, it is desirable that the interleaving be performed immediately before the downstream signal is transmitted over the transmission channel 610. Thereafter, the encoded data is transmitted, by the OLT, over a transmission channel 610 toward the ONUs (e.g., ONUs 120).

When received, each of the ONUs uses a downstream synchronization state machine (e.g., the downstream synchronization state machine 300, 400) for correct synchronization and bit-deinterleaving 612. The bit-deinterleaving is only performed when an ONU has determined that the OLT used bit-interleaving (e.g., 4× bit-interleaving). The ONU then decodes the encoded data using, for example, LDPC decoding 616. After the encoded data has been decoded 616, the ONU descrambles 614 the LDPC decoded data. Thereafter, the data is recovered 618.

Figure 7:
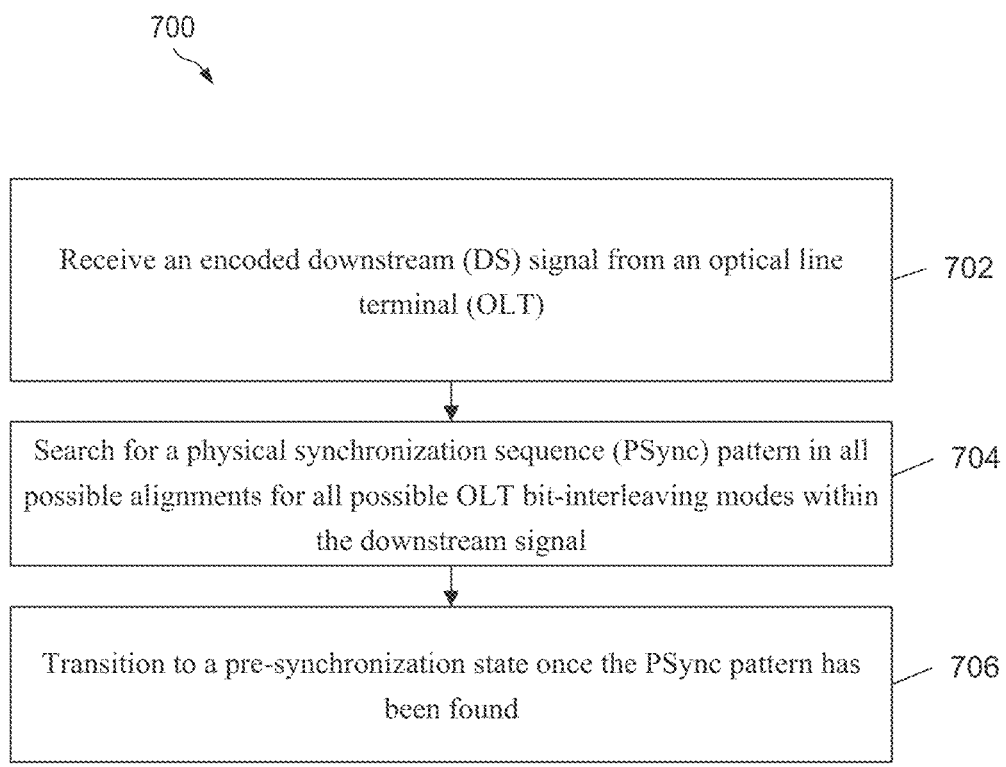
FIG. 7 is a method implemented by an optical network unit (ONU) in a passive optical network according to an embodiment of the disclosure.

FIG. 7 is a method 700 implemented by ONU (e.g., ONU 120) in a passive optical network according to an embodiment of the disclosure. The method 700 may be performed by the ONU to recover encoded data.

In block 702, the ONU receives an encoded DS signal from an optical line terminal (e.g., OLT 110). In block 704, the ONU searches for a PSync pattern in all possible alignments for all possible OLT bit-interleaving modes within the downstream signal. In an embodiment, the downstream signal comprises one or more PHY frames. In an embodiment, searching for the PSync pattern includes error-tolerant pattern matching.

In an embodiment, all possible alignments includes both bit alignments and byte alignments. In an embodiment, all possible OLT bit-interleaving modes comprises a non-interleaving mode and a 4× bit-interleaving mode. In an embodiment, searching for the PSync pattern comprises verifying a SFC HEC.

In an embodiment, during the searching, the ONU switches between a non-deinterleaving mode and a 4× bit-deinterleaving mode every N consecutive failures to find the PSync pattern, wherein N is at least the length of a PHY frame. In an embodiment, the length of the PHY frame comprises 6,220,800 bits. In an embodiment, the ONU is in the Hunt state while performing the searching.

In block 706, the ONU transitions to a pre-synchronization state once the PSync pattern has been found. In an embodiment, the PSync pattern has been found when the PSync pattern with up to a maximum number of bit errors (K) has been detected.

Figure 8:
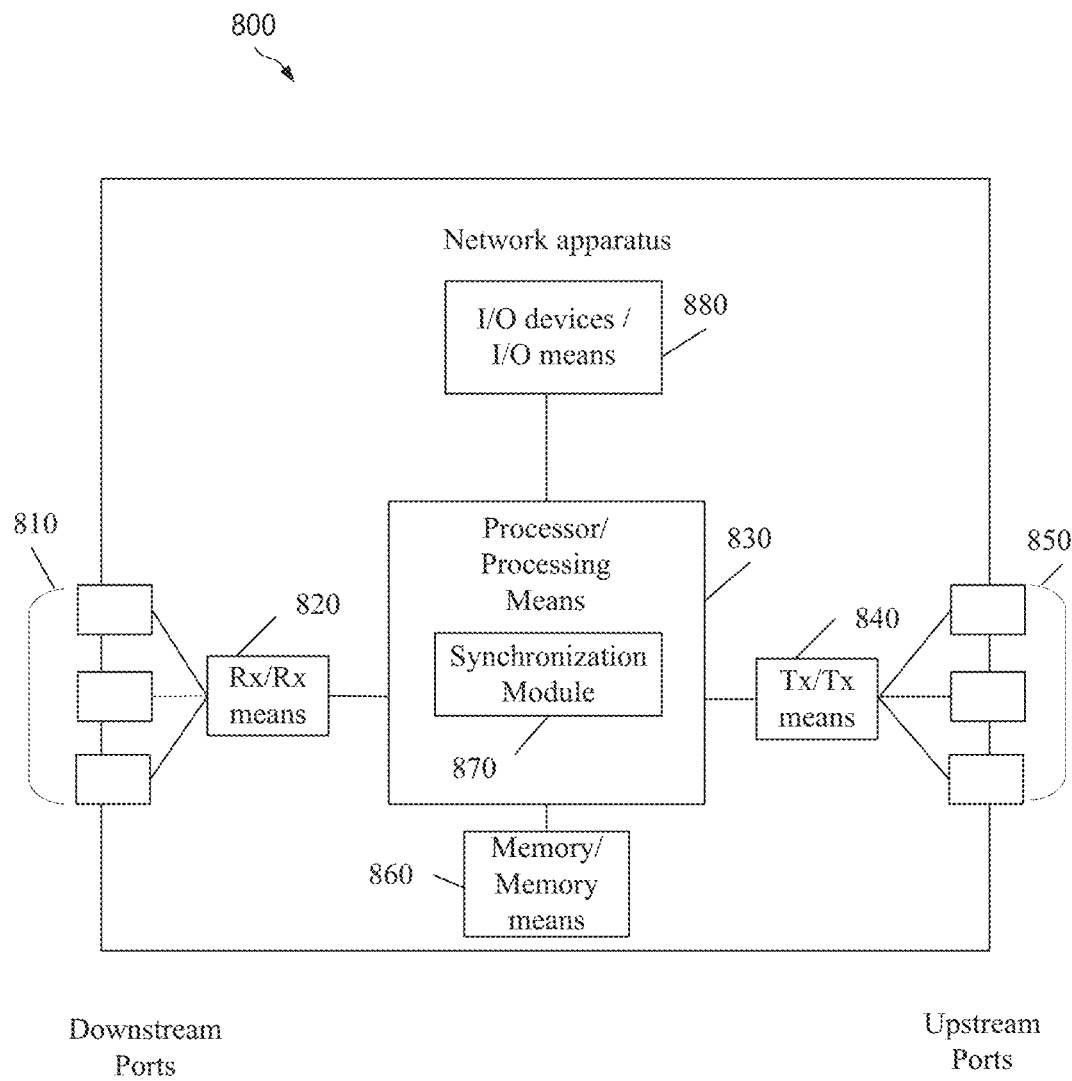
FIG. 8 is a schematic diagram of a network apparatus according to an embodiment of the disclosure.

FIG. 8 is a schematic diagram of a network apparatus 800 (e.g., an ingress router, an egress router, a network device, etc.). The network apparatus 800 is suitable for implementing the disclosed embodiments as described herein. The network apparatus 800 comprises ingress ports/ingress means 810 and receiver units (Rx)/receiving means 820 for receiving data; a processor, logic unit, or central processing unit (CPU)/processing means 830 to process the data; transmitter units (Tx)/transmitting means 840 and egress ports/egress means 850 for transmitting the data; and a memory/memory means 860 for storing the data. The network apparatus 800 may also comprise optical-to-electrical (OE) components and electrical-to-optical (EO) components coupled to the ingress ports/ingress means 810, the receiver units/receiving means 820, the transmitter units/transmitting means 840, and the egress ports/egress means 850 for egress or ingress of optical or electrical signals.

The processor/processing means 830 is implemented by hardware and software. The processor/processing means 830 may be implemented as one or more CPU chips, cores (e.g., as a multi-core processor), field-programmable gate arrays (FPGAs), application specific integrated circuits (ASICs), and digital signal processors (DSPs). The processor/processing means 830 is in communication with the ingress ports/ingress means 810, receiver units/receiving means 820, transmitter units/transmitting means 840, egress ports/egress means 850, and memory/memory means 860. The processor/processing means 830 comprises a synchronization module 870. The synchronization module 870 is able to implement the methods disclosed herein. The inclusion of the synchronization module 870 therefore provides a substantial improvement to the functionality of the network apparatus 800 and effects a transformation of the network apparatus 800 to a different state. Alternatively, the synchronization module 870 is implemented as instructions stored in the memory/memory means 860 and executed by the processor/processing means 830.

The network apparatus 800 may also include input and/or output (I/O) devices/I/O means 880 for communicating data to and from a user. The I/O devices I/O means 880 may include output devices such as a display for displaying video data, speakers for outputting audio data, etc. The I/O devices I/O means 880 may also include input devices, such as a keyboard, mouse, trackball, etc., and/or corresponding interfaces for interacting with such output devices.

The memory/memory means 860 comprises one or more disks, tape drives, and solid-state drives and may be used as an over-flow data storage device, to store programs when such programs are selected for execution, and to store instructions and data that are read during program execution. The memory/memory means 860 may be volatile and/or non-volatile and may be read-only memory (ROM), random access memory (RAM), ternary content-addressable memory (TCAM), and/or static random-access memory (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by an optical network unit (ONU) in a passive optical network (PON), the method comprising:
   receiving an encoded downstream (DS) signal from an optical line terminal (OLT);
   searching for a physical synchronization sequence (PSync) pattern in all possible alignments for all possible OLT bit-interleaving modes within the encoded DS signal, wherein the all possible OLT bit-interleaving modes comprise a non-interleaving mode and a m× bit-interleaving mode in which m adjacent forward error correction (FEC) codewords are interleaved on a bit-by-bit basis; and
   transitioning to a pre-synchronization state once the PSync pattern has been found.

2. The method of claim 1, wherein m is set to 4.

3. The method of claim 1, wherein FEC is based on a low density parity check (LDPC) encoding.

4. The method of claim 1, wherein a FEC codeword length is 17,280 bits.

5. The method of claim 1, wherein during the searching, the ONU switches between a non-deinterleaving mode and a m× bit-deinterleaving mode every N consecutive failures to find the PSync pattern, wherein N is at least a length of a physical layer (PHY) frame, and wherein the m× bit-deinterleaving mode comprises deinterleaving the m adjacent FEC codewords on a bit-by-bit basis.

6. The method of claim 5, wherein the length of the PHY frame comprises 6,220,800 bits.

7. The method of claim 1, wherein the ONU is in a Hunt state while performing the searching and wherein the ONU is unsynchronized while in the Hunt state.

8. The method of claim 7, wherein the ONU is unsynchronized while in the Hunt state.

9. The method of claim 1, wherein the encoded DS signal comprises one or more physical layer (PHY) frames.

10. The method of claim 1, wherein searching for the PSync pattern includes error-tolerant pattern matching or verifying a superframe counter (SFC) hybrid error control (HEC).

11. The method of claim 1, wherein the PSync pattern has been found when the PSync pattern with up to a maximum number of bit errors (K) has been detected.

12. An optical network unit (ONU) in a passive optical network (PON), the ONU comprising:
a memory configured to store instructions; and
one or more processors coupled to the memory, the one or more processors configured to execute the instructions to cause the ONU to:
receive an encoded downstream (DS) signal from an optical line terminal (OLT);
search for a physical synchronization sequence (PSync) pattern in all possible alignments for all possible OLT bit-interleaving modes within the encoded DS signal, wherein the all possible OLT bit-interleaving modes comprise a non-interleaving mode and a m× bit-interleaving mode in which m adjacent forward error correction (FEC) codewords are interleaved on a bit-by-bit basis; and
transition to a pre-synchronization state once the PSync pattern has been found.

13. The ONU of claim 12, wherein m is set to 4.

14. The ONU of claim 12, wherein during the search, the ONU is configured to switch between a non-deinterleaving mode and a m× bit-deinterleaving mode every N consecutive failures to find the PSync pattern, wherein N is at least a length of a physical layer (PHY) frame, and wherein the m× bit-deinterleaving mode comprises deinterleaving the m adjacent FEC codewords on a bit-by-bit basis.

15. The ONU of claim 14, wherein the length of the PHY frame comprises 6,220,800 bits.

16. The ONU of claim 15, wherein the ONU is in a Hunt state while performing the search, and wherein the ONU is unsynchronized while in the Hunt state.

17. A passive optical network (PON), comprising:
an optical line terminal (OLT) configured to transmit an encoded downstream (DS) signal; and
an optical network unit (ONU) in communication with the OLT, wherein the ONU is configured to:
receive the encoded DS signal from the OLT;
search for a physical synchronization sequence (PSync) pattern in all possible alignments for all possible OLT bit-interleaving modes within the encoded DS signal, wherein the all possible OLT bit-interleaving modes comprise a non-interleaving mode and a m× bit-interleaving mode in which m adjacent forward error correction (FEC) codewords are interleaved on a bit-by-bit basis; and
transition to a pre-synchronization state once the PSync pattern has been found.

18. The PON of claim 17, wherein m is set to 4.

19. The PON of claim 17, wherein FEC is based on a low density parity check (LDPC) encoding.

20. The PON of claim 17, wherein a FEC codeword length is 17,280 bits.

* * * * *